United States Patent
Sawamoto et al.

[11] Patent Number: 6,143,163
[45] Date of Patent: Nov. 7, 2000

[54] METHOD OF WATER ELECTROLYSIS

[75] Inventors: Isao Sawamoto, Fukushima; Kuniaki Yamada, Kanagawa; Yoshinori Nishiki, Kanagawa; Masashi Tanaka, Kanagawa; Naoaki Sakurai, Kanagawa; Naoya Hayamizu, Kanagawa, all of Japan

[73] Assignees: Permelec Electrode Ltd.; Kabushiki Kaisha Toshiba, both of Kanagawa, Japan

[21] Appl. No.: 09/115,268

[22] Filed: Jul. 14, 1998

[30]     Foreign Application Priority Data

Aug. 6, 1997 [JP] Japan .................................. 9-224358

[51] Int. Cl.[7] ........................................................ C02F 1/461
[52] U.S. Cl. .................... 205/742; 205/746; 204/229.8; 204/230.2; 204/263
[58] Field of Search .................................. 205/742, 746; 204/263, 229.8, 230.2

[56]               References Cited
               FOREIGN PATENT DOCUMENTS
407242402  9/1995  Japan .

*Primary Examiner*—Arun S. Phasge
*Attorney, Agent, or Firm*—Sughrue, Mion, Zinn, Macpeak & Seas, PLLC

[57]              ABSTRACT

A method of water electrolysis for producing acidic water and alkaline water is disclosed, which is effective in preventing the dissolution of electrode material in the acidic water, etc. attributable to a reverse current flowing in a power supply cutoff state and also in preventing electrode deactivation caused by the electrode material dissolution. This enables the electrolytic cell to be operated stably over a long period of time to yield high-purity acidic and alkaline waters. An electrolytic cell 1 partitioned into an anode chamber and a cathode chamber with a cation-exchange membrane 2 as a solid electrolyte is used to electrolytically produce acidic water and alkaline water. A voltage of 1.2 V or higher and/or a current of 20 mA/dm$^2$ or higher is applied between the anode 7 and the cathode 8 when the electrolytic cell is in a power supply cutoff state.

20 Claims, 2 Drawing Sheets

METHOD OF WATER ELECTROLYSIS

FIELD OF THE INVENTION

The present invention relates to a method of water electrolysis for obtaining high-purity acidic water and alkaline water by preventing impurities from contaminating acidic and alkaline waters produced by water electrolysis. More particularly, this invention relates to a method of water electrolysis for obtaining high-purity acidic water and alkaline water by preventing contamination by an electrode material which may dissolve in the electrolyte liquid due to a reverse current flowing in a power supply cutoff state.

BACKGROUND OF THE INVENTION

In producing and cleaning electronic parts, media specially prepared for these purposes have conventionally been used, such as, e.g., sulfuric acid, hydrofluoric acid, hydrogen peroxide and hydrochloric acid. These cleaning media will continue to be suitably used depending on the intended application. However, because these cleaning media are obtained by specially purifying corresponding products produced through chemical processes, the purification operations are complicated. This is because the purification involves the step of removing metallic ingredients which have contaminated the chemical products, for example, from the catalysts used for producing the same. As a result, the purified products are expensive. In addition, even if the purification operations are carefully conducted, the thus purified products cannot always provide the reduction in allowable impurity amounts needed with the advancement in electronic devices. New substitute techniques are hence desired.

One of these substitute techniques is the use of ozonized water. In particular, highly ozonized water produced by electrolysis is known to be exceedingly effective, e.g., in cleaning electronic devices. However, because the use of ozonized water alone is insufficient in some cases, there is a growing need for a treatment liquid which has one or more functions not possessed by ozonized water, e.g., an oxidizing function and a reducing function, and which contains no metallic elements at all.

Among such treatment liquids is a so-called acidic water or ultra-acidic water. The acidic water generally has a pH of 3 or lower and an oxidation-reduction potential (ORP) of 1.2 V or higher and hence has an oxidizing capability. Consequently, the acidic water has the effect of, for example, decomposing organic substances or dissolving metallic deposits therein to remove these impurities, and is being used, although in a small amount, for the cleaning of electronic devices, etc.

Simultaneous with the production of the acidic water in an electrolytic cell, alkaline water having a pH of 10 or higher and an ORP of 0 V or lower is produced as a by-product in the cathode chamber of the electrolytic cell. Investigations on the use of this alkaline water for cleaning, etc., have been initiated.

In the electrolytic production of modified acidic water and alkaline water (cleaning waters), a two-chamber type electrolytic cell is generally used which has been partitioned into an anode chamber and a cathode chamber with an ion-exchange membrane serving as a diaphragm. For conducting electrolysis using this electrolytic cell, an appropriate supporting electrolyte is added to the electrolyte liquid in order to impart ionic conductivity thereto. However, in most cases, the cleaning water thus produced contains the supporting electrolyte remaining therein or is contaminated with metallic ions and particles. These contaminants are attributable to dissolution of the material constituting the inner wall of the electrolytic cell main body in the electrolyte liquid. If such contaminated cleaning water is used for cleaning electronic devices such as semiconductors and liquid crystals, metallic ions and other contaminants contained in the cleaning water adhere to the semiconductor surfaces and can cause insulation failures.

Consequently, for further improving the purity of the cleaning water, a proposal has been made to use ultrapure water as an electrolyte without using a cleaned supporting electrolyte which is purified by removing contaminants before supplying it to the cell. The cleaning water thus produced by electrolysis has a high purity satisfactory even for semiconductor cleaning.

In the above electrolytic operation, a DC power supply employing a rectifying element such as a selenium or silicon rectifier is used to supply power to the electrolytic cell for water electrolysis. In this electrolytic operation, cleaning-water production is not continuous over the course of 24 hours, and power is usually supplied for several hours per day at the most. Thus, the electrolytic cell is mostly in a power supply cutoff state. However, the DC power supply has no electromotive force in a power supply cutoff state, as in the above suspension of operation or during service interruption. Furthermore, the anode and cathode of the power supply are electrically connected to each other through the electrolytic cell for water electrolysis when a liquid is present in the cell. Consequently, in such circumstances, the electrolytic cell functions as a battery such that a reverse current flows through the electrolytic cell. This results in the following adverse effects. Namely, the reverse current not only causes an electrode material covered with an electrode to dissolve out to thereby deactivate the electrode, but also, the dissolved electrode material is eluted into the acidic water or alkaline water thus produced to thereby contaminate the same.

In an electrolytic cell for electrolytic ozone gas generation which is used for water electrolysis for generating an oxygen-containing ozone gas in the anode chamber, a DC power supply circuit capable of always supplying power to the anode chamber side even in a power supply cutoff state is generally used. This prevents the anode material from being deactivated in a current cutoff state, and therefore prevents the anode material from being reduced by a reverse current generated in a current cutoff state. As a result, restarting the power supply does not result in the same current efficiency for the ozone generation as before.

Besides the use of the above-described DC power supply circuit, an effective means for preventing the generation of a reverse current in a power supply cutoff state may be to interpose, between the DC power supply and the electrolytic cell for water electrolysis, a DC circuit breaker which opens when the power supply is turned off. However, the use of a circuit breaker is disadvantageous in that when a large current is supplied, the contact point of the breaker deteriorates when the current is turned off. Furthermore, because a reverse current flows in an amount corresponding to the internal impedance of the breaker, this results in deterioration of the electrode in a power supply cutoff state and contamination of the electrolyte liquid.

SUMMARY OF THE INVENTION

It is therefore an object of the present invention to provide a method of water electrolysis which is almost free from the generation of reverse current in a power supply cutoff state, and which solves the above-described problems of prior art. Namely, in electrolytically producing acidic water and alkaline water, an electrode material elutes into the acidic or alkaline water to contaminate the same due to a reverse current flowing in a power supply cutoff state when a liquid is present in the electrolytic cell. Furthermore, because the electrode itself is thus deactivated, stable electrolytic operation cannot be continued over a long period of time.

The above objects of the present invention are achieved by providing a method of water electrolysis, which comprises providing a main power supply having a power ON state and a power CUTOFF state and an electrolytic cell for water electrolysis partitioned into an anode chamber and a cathode chamber or into an anode chamber, an intermediate chamber and a cathode chamber with a solid electrolyte, supplying water to the electrolytic cell, applying power from the main power supply to the electrolytic cell in a first direction when in a power ON state to thereby electrolyze the water to produce acidic water and alkaline water in the anode chamber and the cathode chamber, respectively, and substantially preventing current flow in a reverse direction when liquid is present in the electrolytic cell and the main power supply is in a power CUTOFF state.

In a preferred embodiment, the method comprises applying a voltage in said first direction of 1.2 V or higher across the anode and the cathode of the electrolytic cell when liquid is present in the electrolytic cell and the power supply is in a power CUTOFF state.

In yet another preferred embodiment, the method comprises passing a current of 20 mA/dm$^2$ or higher through the electrolytic cell in said first direction when liquid is present in the electrolytic cell and the power supply is in power CUTOFF state.

Figure 1:
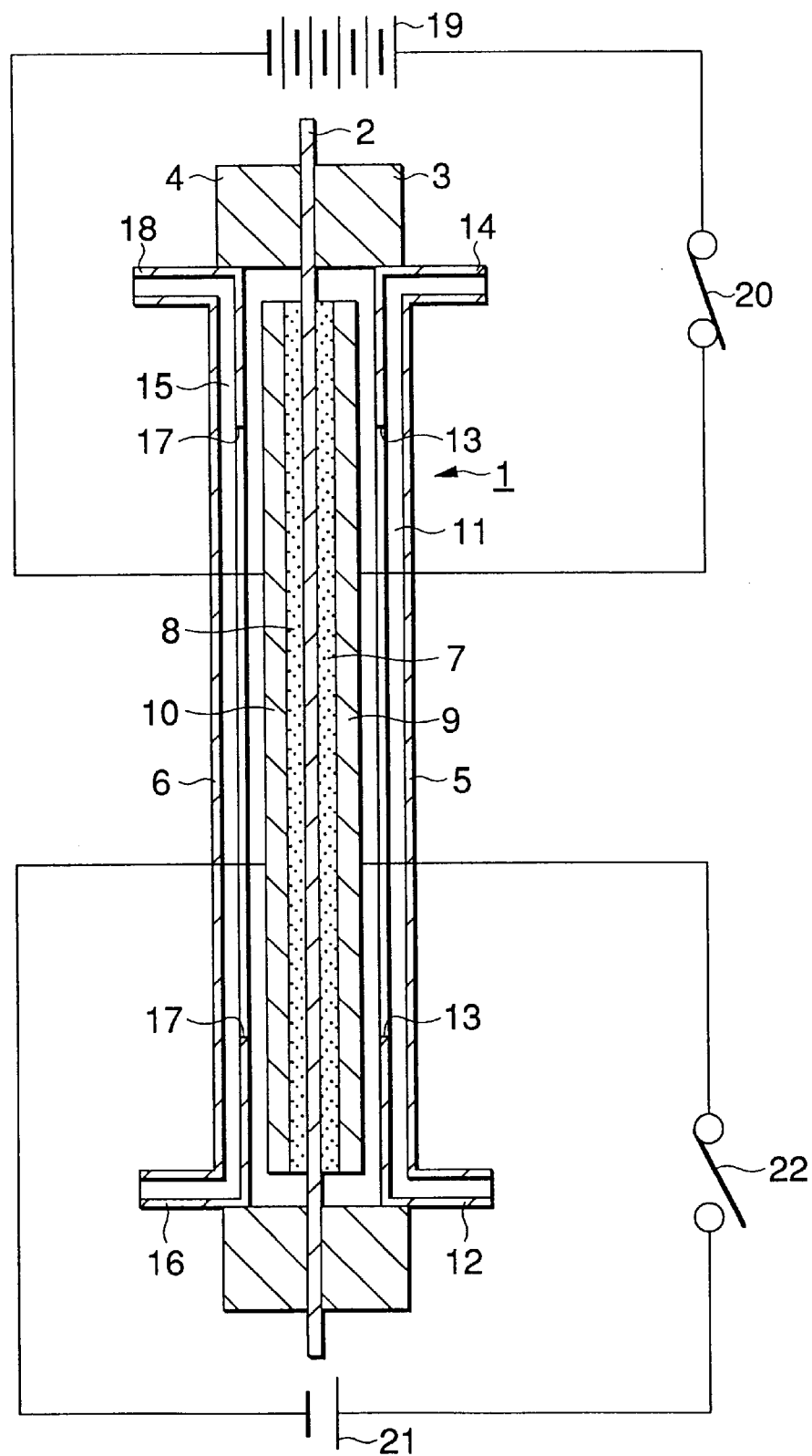
FIG. 1 is a diagrammatic vertical sectional view illustrating a two-chamber type electrolytic cell for use in the method of the present invention.
Figure 2:
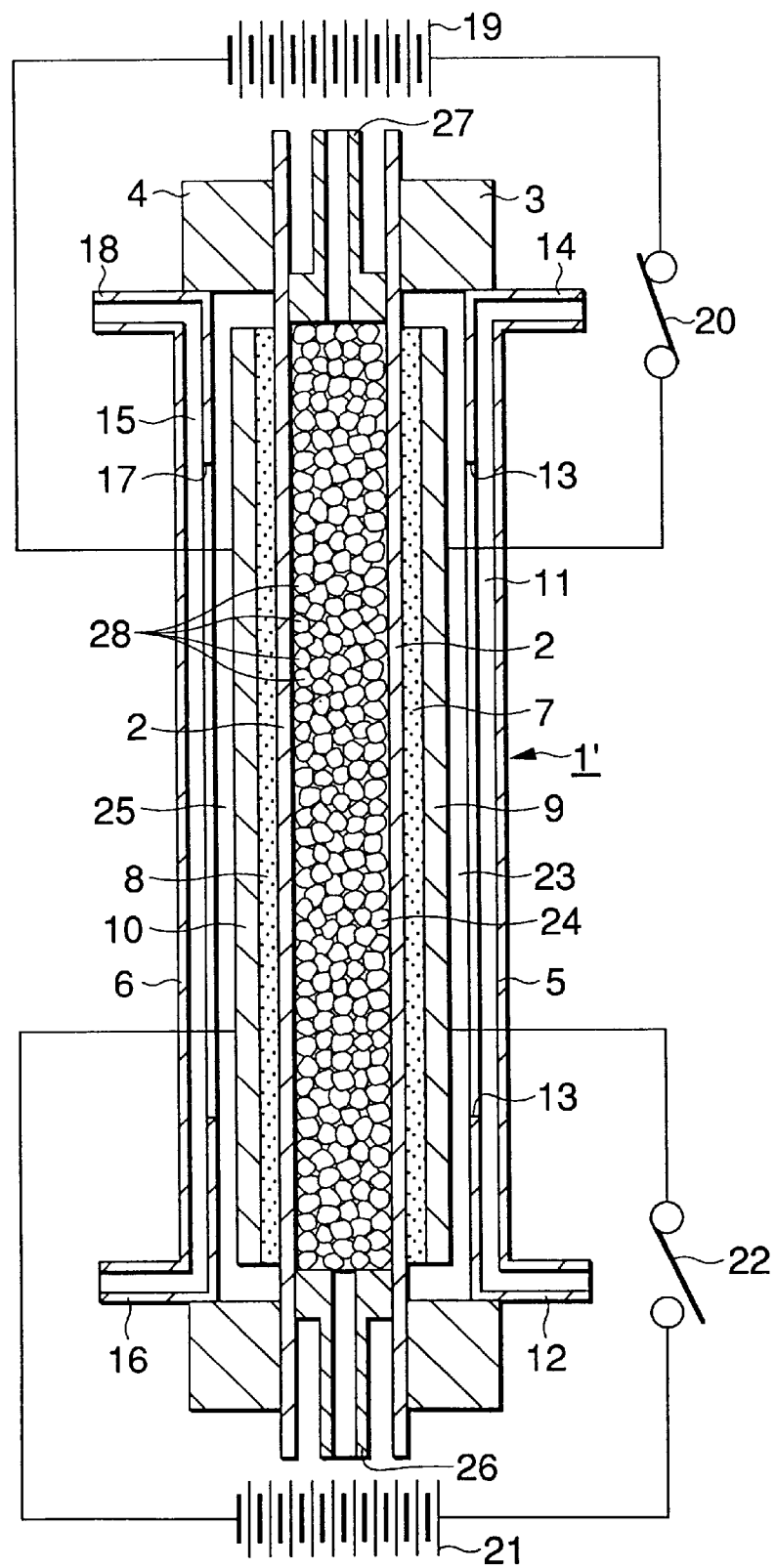
FIG. 2 is a diagrammatic vertical sectional view illustrating a three-chamber type electrolytic cell for use in the method of the present invention.

The reference numbers shown in FIGS. 1 and 2 are defined below. 1, 1' . . . electrolytic cell main body, 2 . . . cation-exchange membrane, 3 . . . anode chamber gasket, 4 . . . cathode chamber gasket, 5 . . . anode chamber wall plate, 6 . . . cathode chamber wall plate, 7 . . . anode, 8 . . . cathode, 9 . . . anode collector, 10 . . . cathode collector, 11 . . . anolyte passageway, 12 . . . anolyte inlet, 13 . . . anode chamber opening, 14 . . . anolyte outlet, 15 . . . catholyte passageway, 16 . . . catholyte inlet, 17 . . . cathode chamber opening, 18 . . . catholyte outlet, 19 . . . main power supply, 20 . . . switch, 21 . . . auxiliary power supply, 22 . . . switch, 23 . . . anode chamber, 24 . . . intermediate chamber, 25 . . . cathode chamber, 26 . . . intermediate-chamber liquid inlet, 27 . . . intermediate-chamber liquid outlet, 28 . . . ion-exchange resin.

DETAILED DESCRIPTION OF THE INVENTION

The characteristic feature of the method of water electrolysis of the present invention is that the generation of a reverse current which results from power supply cutoff when a liquid is present in an electrolytic cell is prevented by applying a normal-direction voltage and/or current between the anode and cathode of the electrolytic cell in a power supply cutoff state. This inhibits contamination of the electrolyte liquid, etc. and also inhibits deactivation of the electrode which are both caused by dissolution of the electrode material. Thus, long-term stable electrolytic operation can be achieved.

In an electrolytic cell for water electrolysis, electrolysis results in the generation of oxygen gas in the anode chamber simultaneously with the formation of acidic water having a high oxidation-reduction potential. In the cathode chamber, on the other hand, electrolysis results in the generation of hydrogen gas simultaneously with the formation of alkaline water having a low oxidation-reduction potential. During electrolysis, a reverse current is not generated. This is because a potential accompanying the generation of oxygen gas and hydrogen gas continues to be applied to the two electrodes, and the voltage difference between the two electrodes is not less than the potential difference for gas generation. However, when the power supply is cutoff, the anode and the cathode each assumes a potential depending on the environment of the anode or cathode chamber. Even when the anolyte and the catholyte are quickly removed after electrolysis, the two chambers still differ in environment just after electrolysis is discontinued such that a reverse current flows from the cathode to the anode.

As a result of measurements made by the present inventors, the magnitude of the reverse current which flows at the moment electrolysis is discontinued was found to be 50 mA/dm$^2$ or larger. Due to this reverse current, the anode material and the collector of the anode chamber are reduced, while the cathode material and the collector of the cathode chamber are oxidized. This in turn leads to metal dissolution and/or electrode deactivation.

In order to prevent such a phenomenon, a voltage and/or an electric current is applied in the present invention between the anode and the cathode of an electrolytic cell in a power supply cutoff state as stated above. The voltage and/or the current are applied in such a degree as to be insufficient to cause electrolysis but sufficient to completely or almost completely prevent the generation of a reverse current.

When the voltage applied during the power supply cutoff state is set to 1.2 V, the acidic water and alkaline water thus obtained can be used for semiconductor cleaning without difficulty, although dissolution of the electrode material in a slight amount around the detection limit is observed. When the voltage is increased to 1.5 V, dissolution of an electrode material in an amount on or above the detection limit does not occur, and the acidic water and alkaline water thus obtained can be used as an ultrahigh-purity cleaning water for semiconductors and liquid crystals. Consequently, the voltage applied in a power supply cutoff state is set to 1.2 V or higher.

When the electric current passed through the electrolytic cell in a power supply cutoff state is set to 20 mA/dm$^2$, the acidic water and alkaline water thus obtained can be used for semiconductor cleaning without difficulty, although dissolution of the electrode material in a slight amount around the detection limit is observed. When the electric current is increased to 50 mA/dm$^2$, dissolution of the electrode material in an amount on or above the detection limit does not occur, and the acidic water and alkaline water thus obtained can be used as an ultrahigh-purity cleaning water for semiconductors and liquid crystals. Consequently, the quantity of electric current passed through the electrolytic cell in a power supply cutoff state is set to 20 mA/dm$^2$ or more.

For applying the voltage and the current, a power supply other than the main power supply for electrolysis can be used. Since the quantity of electricity required is small, a power supply having a smaller capacity than the main power supply may be used as this auxiliary power supply and connected to the anode and the cathode. Although power feeding from the auxiliary power supply may be initiated simultaneously with cutoff of the main power supply, a time lag between the main power supply cutoff and the initiation of power feeding from the auxiliary power supply is apt to cause a reverse current to flow. It is therefore desirable to apply or input a given voltage and/or current from the auxiliary power supply prior to cutting off the main power supply, and to cut off the main power supply after the power feeding from the auxiliary power supply becomes stable. In case of an emergency such as a service interruption, a charged auxiliary power supply may be used so as to initiate power feeding therefrom simultaneously with cutting off the main power supply due to the service interruption. This minimizes the generation of reverse current and the quantity thereof.

In the present invention, a perfluorocarbon cation-exchange membrane or the like is used as a solid electrolyte serving as a diaphragm for the electrolytic cell. With this cation-exchange membrane, the electrolytic cell is partitioned into an anode chamber and a cathode chamber or into an anode chamber, an intermediate chamber and a cathode chamber. Because the cation-exchange membrane is almost completely impermeable to liquids unlike conventional neutral diaphragms, the anolyte and catholyte or the anolyte, catholyte and intermediate-chamber liquid hardly mix with each other. Consequently, a decrease in efficiency which results if the anolyte (acidic water) and catholyte (alkaline water) thus produced partly mix with each other can be avoided and the electrolytic cell can be operated at a high current density. As a result, the desired cleaning waters can be obtained in a short time period.

Forming an intermediate chamber as described above and supplying pure water thereto is effective not only in preventing the anolyte and the catholyte from mixing, but also in preventing the generation of a gas due to such mixing. In this structure, the intermediate chamber should be filled with an ionically conductive material (e.g., an ion-exchange resin) because the intermediate-chamber liquid in the intermediate chamber is not electrically conductive.

Although reasons have not been elucidated in detail, the consumption of the electrode material is reduced by using a cation-exchange membrane and, hence, contamination of the cleaning water with an electrode material can be avoided. This effect is considered to be attributable to the following. Due to the satisfactory conductivity of the electrolyte (cation-exchange membrane), current unevenness is eliminated to partly reduce the electrical resistance, whereby a temperature increase is inhibited. Furthermore, the part which contacts the membrane functions three-dimensionally, whereby the load imposed on the electrodes is lessened substantially.

The material of the electrode chamber frames is desirably a fluororesin. The term "electrode chamber frames" as used herein means the constituent parts of the electrolytic cell other than the cation-exchange membrane, the electrodes, and the collectors, and in particular refers to those constituent parts which contact the liquid electrolyte. Examples of the electrode chamber frames include the inner wall plates and base plate of the electrolytic cell. At least those parts which always contact an electrolyte liquid during electrolysis are preferably made of a fluororesin. Although the frames of both electrode chambers are desirably made of a fluororesin, at least the anode chamber frame or at least the cathode chamber frame is made of a fluororesin when the electrolytic cell is used for producing acidic water or alkaline water, respectively. This is because in the case where acidic water only or alkaline water only is to be produced, dissolution of a constituent substance of the chamber frame in alkaline water or acidic water, respectively, does not pose a problem.

A fluororesin is a polymer having end groups each terminated by fluorine (F), and has exceedingly high corrosion resistance. In addition to high resistance to ultrapure water and hydrochloric acid, a fluororesin has exceedingly high resistance to radicals, e.g., ozone, generated by the electrolysis of ultrapure water. The fluororesin hence minimizes particle inclusion and metal dissolution from the chamber frames and enables the cleaning water thus obtained to be used for cleaning electronic devices such as semiconductors.

In the case of producing acidic water, an anode material which is not susceptible to dissolution during acidic-water production is used. Examples of the anode material include platinum group metals such as platinum, ruthenium, iridium, rhodium, palladium, and osmium and oxides of platinum group metals, such as ruthenium oxide and iridium oxide. These metals or metal oxides are scarcely consumed by electrolysis, and hence are scarcely dissolved in the cleaning water. Thus, the above described anode materials are effective in preventing contamination of the cleaning water thus obtained. On the other hand, if carbon is used as the anode material, the carbon is oxidized by the anodic reaction to yield carbon dioxide and poses a problem in that the anode becomes brittle.

The use of a platinum group metal or an oxide thereof is also effective in controlling the properties of the acidic water thus obtained. For example, when platinum is used as an anode material for the electrolysis of an electrolyte liquid in which chloride ion is present, not only is chloride ion oxidized to hypochlorite ion to thereby obtain a further increased oxidation-reduction potential, but also the resultant hydrogen ion serves to attain a sufficiently reduced pH. In either case, unlike a carbon electrode the platinum group metal or oxide thereof is not consumed, even though the anodic reaction is an oxygen-generating reaction.

Selection of a cathode material can effect a decrease in electrolytic voltage, but a decrease in electrolytic voltage does not influence dissolution of the cathode material into the acidic water. Consequently, appropriate selection of a cathode material should also be taken into account in the case of acidic-water production. The cathode for use in the present invention is preferably a sheet-form electrode made of platinum and/or carbon and has an opening size of 100 $\mu$m or smaller. Due to the use of platinum and/or carbon as a cathode, the electrode is stable and cathode-material dissolution is minimized.

The electrode sheet having an opening size of 100 $\mu$m or smaller, preferably from 4 to 50 $\mu$m, is kept in even contact with the cation-exchange membrane. This inhibits current localization such that a low electrolytic voltage can be maintained. Furthermore, due to use of the electrode sheet, the generation of hydrogen gas occurs evenly over the whole cathode surface and degassing can be smoothly conducted. Hence, the hydrogen gas generating on the cathode is less apt to move into the anode chamber, to thereby prevent a decrease in and maintain a high anolyte oxidation-reduction potential.

In the case of producing alkaline water, platinum or ruthenium oxide can be used as a cathode material. These substances, when used as a cathode, are hardly consumed by electrolysis and are effective in reducing electrolytic voltage because of their low overvoltage. For example, if a metal such as stainless steel, nickel or titanium is used as a cathode in place of platinum or ruthenium oxide, such a metal not only increases the electrolytic voltage because of its high overvoltage to result in an increased power cost, but is also consumed to a considerable extent by electrolysis. This poses a problem in that metal ions dissolve and are introduced into the cleaning water thus obtained. The use of such contaminated cleaning water for cleaning semiconductors or liquid crystals more frequently results in insulation failure due to the metal ions.

In alkaline-water production, zirconium is preferably used as a cathode collector. This also is because materials other than zirconium, such as stainless steel and nickel, dissolve out considerably and the alkaline water thereby produced is unsuitable for cleaning electronic devices.

In order to produce acidic water, pure water and/or hydrochloric acid, etc., are supplied to the anode chamber of the electrolytic cell described above and a voltage is applied between the anode and the cathode. When pure water alone is supplied, the cation-exchange membrane functions as an electrolyte and oxygen (which may contain ozone) is generated as a result of water electrolysis. The oxygen dissolves in the anolyte to yield acidic water.

When hydrochloric acid is supplied to the anode chamber, chloride ion is electrolytically oxidized to chlorine gas and then to hypochlorite ion. As a result, acidic water having a low pH and a high oxidizing ability is produced.

There are cases where the acidic water thus produced contains a slight amount of cations. In the method of the present invention, acidic water having an even higher purity can be obtained by passing the acidic water thus produced through a column packed with a cation-exchange resin disposed outside the electrolytic cell in order to remove cationic impurities.

On the other hand, in order to produce alkaline water, pure water and/or ammonium hydroxide, etc., are supplied to the cathode chamber of the electrolytic cell described above and a voltage is applied between the anode and the cathode. When pure water alone is supplied, the cation-exchange membrane functions as an electrolyte, and hydroxyl ion is generated as a result of water electrolysis. Thus, alkaline water is obtained.

When ammonium hydroxide is supplied to the cathode chamber, the hydroxyl ion concentration increases to yield even stronger alkaline water.

There are cases where the alkaline water thus produced contains a slight amount of anions. In the method of the present invention, alkaline water having an even higher purity can be obtained by passing the alkaline water thus produced through a column packed with an anion-exchange resin disposed outside the electrolytic cell in order to remove anionic impurities.

FIG. 1 is a diagrammatic vertical sectional view illustrating a two-chamber type electrolytic cell for use in the method of the present invention.

The electrolytic cell main body 1 comprises a perfluorocarbon cation-exchange membrane 2, and an architrave-like anode chamber gasket 3 and an architrave-like cathode chamber gasket 4 which sandwich the membrane 2. An anode chamber wall plate 5 and a cathode chamber wall plate 6 are respectively disposed on the gaskets 3 and 4 on opposing sides of the cation-exchange membrane 2, and each functions to pass an electrolyte liquid therethrough.

The cation-exchange membrane 2 has, on the anode side, a porous anode 7 which comprises particles of either a platinum group metal or an oxide thereof and is in intimate contact with the membrane 2. The cation-exchange membrane 2 further has, on the cathode side, a porous sheet-form cathode 8 which comprises platinum or carbon and is in intimate contact with the membrane 2. An anode collector 9 and a cathode collector 10 are connected to the anode 7 and the cathode 8, respectively. A voltage is applied across these collectors.

An anolyte passageway 11 is formed within the anode chamber wall plate 5 so that an anolyte containing hydrochloric acid or the like dissolved therein or ultrapure water each supplied through an anolyte inlet 12 enters into the anode chamber through an anode chamber opening 13 and contacts the anode 7. As a result, the anolyte or the ultrapure water is oxidized into a compound having a high oxidizing ability and a high oxidation-reduction potential, e.g., hypochlorous acid, or generates oxygen gas, to thereby produce acidic water which is removed through an anolyte outlet 14.

On the other hand, a catholyte passageway 15 is formed within the cathode chamber wall plate 6 so that ultrapure water supplied as needed through a catholyte inlet 16 enters into the cathode chamber through a cathode chamber opening 17 and contacts the cathode 8 together with the ion-containing water which migrates from the anode. As a result, the water is reduced to produce alkaline water which is removed through a catholyte outlet 18.

A main power supply 19 having a large capacity is connected to both the anode collector 9 and the cathode collector 10. Power from the main power supply 19 is cut off or initiated by the switching operation of a switch 20. Likewise, an auxiliary power supply 21, besides the main power supply, is connected to both collectors 9 and 10, and power from the auxiliary power supply 21 is cut off or initiated by the switching operation of a switch 22.

Cleaning-water production with the electrolytic cell shown in FIG. 1 is conducted in the following manner. During ordinary electrolysis, the main power supply 19 is on and the auxiliary power supply 21 is off, whereby a voltage and power needed for ordinary electrolytic operation are applied to both electrodes. On the other hand, when the electrolysis is to be stopped, the auxiliary power supply 21 is first switched on while the main power supply 19 is kept on. After the power supplied from the auxiliary power supply 21 has become stable, the main power supply 19 is switched off. Even in this state, a voltage and/or current sufficient to prevent a reverse current is applied by the auxiliary power supply 21. Consequently, dissolution of an electrode material does not occur, and cleaning-water contamination and electrode deactivation can be prevented. An emergency such as a service interruption may be coped with as follows. The auxiliary power supply is maintained in a charged state capable of supplying the requisite power, regardless of whether or not service interruption occurs. Immediately after the main power supply 19 cuts off, power feeding from the auxiliary power supply 21 is initiated to thereby minimize the generation of a reverse current and the quantity thereof.

FIG. 2 is a diagrammatic vertical sectional view illustrating a three-chamber type electrolytic cell for use in the method of the present invention. This three-chamber type electrolytic cell is an improvement of the two-chamber type electrolytic cell described above. Hence, like parts and portions are designated by like numerals, and explanations thereof have been omitted.

The electrolytic cell main body 1' is partitioned into an anode chamber 23, an intermediate chamber 24 and a cathode chamber 25 with two perfluorocarbon cation-exchange membranes 2. This intermediate chamber 24 is constituted of an architrave-like frame having an intermediate-chamber liquid inlet 26 and an intermediate-chamber liquid outlet 27 in a lower part and an upper part thereof, respectively. The inside of the intermediate chamber 24 is filled with many particles of an electroconductive ion-exchange resin 28 so as to electrically connect the two cation-exchange membranes 2 to each other.

An anolyte and a catholyte are supplied and removed in the same manner as in the electrolytic cell shown in FIG. 1. Electrolysis is conducted while additionally supplying pure water to the intermediate chamber 24. As a result, acidic water and alkaline water are removed through an anolyte outlet 14 and a catholyte outlet 18, respectively. In this operation, if the anolyte or catholyte or the gas generated on the anode or cathode passes through the nearby cation-exchange membrane 2, it does not enter the cathode chamber or anode chamber, respectively, because the intermediate chamber 24 is present between the anode chamber 23 and the cathode chamber 25. Therefore, the acidic water and alkaline water thus produced do not become contaminated.

Examples of the method of water electrolysis according to the present invention are given below, but these Examples should not be construed as limiting the scope of the invention.

EXAMPLE 1

A gas- and liquid-permeable porous anode made of platinum-covered titanium and an anode collector made of platinum were attached to a perfluorocarbonsulfonic acid type cation-exchange membrane Nafion 117 (manufactured by E.I. du Pont de Nemours & Co.) on its anode side. A platinum mesh electrode having an opening size of about 100 $\mu$m and a cathode collector made of zirconium were further attached to the cation-exchange membrane on its cathode side to fabricate a two-chamber type electrolytic cell for water electrolysis. A main power supply and an auxiliary power supply were connected to both collectors. Electrolysis was conducted at a temperature of 25° C., while supplying ultrapure water to each of the anode chamber and cathode chambers at a rate of 500 ml/min and an electric current of about 30 A/dm$^2$ from the main power supply. As a result, acidic water having an oxidationreduction potential of 1,150 mV and a pH of 6.5 and alkaline water having an oxidation-reduction potential of −400 mV and a pH of 7.5 were obtained.

The electrolytic operation was repeatedly stopped and started ten times per day in such manner that during the suspension of operation, a voltage of 1.5 V and a current of 50 mA/dm$^2$ continued to be applied from the auxiliary power supply. On the 100th day, the anolyte obtained 30 minutes after initiating electrolysis was measured for oxidation-reduction potential and platinum concentration. As a result, the anolyte was found to have an oxidation-reduction potential of 1,200 mV and a platinum concentration lower than 5 ng/l (detection limit).

COMPARATIVE EXAMPLE 1

Electrolysis was conducted under the same conditions as in Example 1, except that the auxiliary power supply was omitted and neither voltage nor current was applied during the suspension of electrolytic operation.

On the 100th day, the anolyte obtained 30 minutes after initiating electrolysis was measured for oxidation-reduction potential and platinum concentration under the same conditions. As a result, the anolyte was found to have an oxidation-reduction potential of 500 mV and a platinum concentration of 300 ng/l. These results show that platinum dissolution had been proceeding during the course of the electrolytic operation.

EXAMPLE 2

Electrolysis was conducted under the same conditions as in Example 1, except that the voltage and the current applied from the auxiliary power supply were changed to 1.2 V and 20 mA/dm$^2$, respectively.

On the 100th day, the anolyte obtained 30 minutes after initiating electrolysis was measured for oxidation-reduction potential and platinum concentration under the same conditions. As a result, the anolyte was found to have an oxidation-reduction potential of 800 mV and a platinum concentration of 40 ng/l.

COMPARATIVE EXAMPLE 2

Electrolysis was conducted under the same conditions as in Example 1, except that the voltage and the current applied from the auxiliary power supply were changed to 1.0 V and 10 mA/dm$^2$, respectively.

On the 100th day, the anolyte obtained 30 minutes after initiating electrolysis was examined for oxidation-reduction potential and platinum concentration under the same conditions. As a result, the anolyte was found to have an oxidation-reduction potential of 700 mV and a platinum concentration of 60 ng/l. These results show that platinum dissolution had proceeded slightly during the course of the electrolytic operation.

The method of water electrolysis of the present invention, which comprises supplying feedstock water to an electrolytic cell for water electrolysis which has been partitioned into an anode chamber and a cathode chamber or into an anode chamber, an intermediate chamber and a cathode chamber with a solid electrolyte and electrolyzing the water to produce acidic water and alkaline water in the anode chamber and the cathode chamber, respectively, is characterized in that a voltage of 1.2 V or higher and/or a current of 20 mA/dm$^2$ or higher is applied between the anode and the cathode when liquid is present in the electrolytic cell even in a power supply cutoff state.

The present invention, when used for the electrolytic production of water such as acidic water or alkaline water, is effective in preventing the generation of a reverse current in circumstances such as suspension of electrolytic operation and service interruption. The voltage and current values specified above are sufficient to completely or almost completely compensate for the potential difference between the anode and the cathode which may result from the potential difference between the two electrodes at the time of power supply cutoff. By applying a voltage and/or a current of the above specified values between the anode and the cathode in a power supply cutoff state, the generation of reverse current is prevented. Hence, the dissolution of the electrode material and the resultant contamination of an electrolyte liquid and electrode deactivation can be inhibited.

Although the electrolytic cell for use in the present invention may be either the two-chamber type or three-chamber type, use of a three-chamber type electrolytic cell is effective in obtaining higher-purity acidic water and alkaline water. This is because the three-chamber construction prevents the anolyte and catholyte that are being produced from mixing with each other and from mixing with gas that is being generated in the electrolysis.

While the invention has been described in detail and with reference to specific embodiments thereof, it will be apparent to one skilled in the art that various changes and modifications can be made therein without departing from the spirit and scope thereof.

What is claimed is:

1. A method of water electrolysis, which comprises providing a main power supply having a power ON state and a power CUTOFF state and an electrolytic cell for water electrolysis partitioned into an anode chamber including an anode and a cathode chamber including a cathode or into an anode chamber including an anode, an intermediate chamber and a cathode chamber including a cathode with a solid electrolyte, supplying water to the electrolytic cell, applying power from the main power supply to the electrolytic cell in a first direction when in a power ON state to thereby electrolyze the water to produce acidic water and alkaline water in the anode chamber and the cathode chamber, respectively, and substantially preventing current flow in a reverse direction when liquid is present in the electrolytic cell and the main power supply is in a power CUTOFF state which comprises (i) applying a voltage in said first direction of 1.2 V or higher across the anode and the cathode of the electrolytic cell and (ii) passing a current of 20 mA/dm$^2$ or higher through the electrolytic cell in said first direction.

2. The method of claim 1, which comprises applying a voltage in said first direction of 1.5 V or higher across the anode and the cathode of the electrolytic cell when liquid is present in the electrolytic cell and the main power supply is in a power CUTOFF state.

3. The method of claim 1, which comprises passing a current of 50 mA/dm$^2$ or higher through the electrolytic cell in said first direction when liquid is present in the electrolytic cell and the main power supply is in a power CUTOFF state.

4. The method of claim 1, which comprises applying a voltage in said first direction of 1.2 V or higher across the anode and the cathode of the electrolytic cell and passing a current of 20 mA/dm$^2$ or higher through the electrolytic cell in said first direction so as to substantially prevent current flow in a reverse direction when liquid is present in the electrolytic cell and the main power supply is in a power CUTOFF state but which voltage is insufficient to cause electrolysis.

5. The method of claim 1, which comprises (i) applying a voltage in said first direction of 1.2 V to 1.5 V across the anode and the cathode of the electrolytic cell and (ii) passing a current of 20 mA/dm$^2$ or higher through the electrolytic cell in said first direction when liquid is present in the electrolytic cell and the main power supply is in a power CUTOFF state.

6. The method of claim 1, which comprises (i) applying a voltage in said first direction of 1.2 V to 1.5 V across the anode and the cathode of the electrolytic cell and (ii) passing a current of 20 mA/dm$^2$ to 50 mA/dm$^2$ through the electrolytic cell in said first direction when liquid is present in the electrolytic cell and the main power supply is in a power CUTOFF state.

7. The method of claim 1, which further comprises supplying hydrochloric acid to the anode chamber, and wherein said anode comprises a material selected from the group consisting of platinum group metals and oxides of platinum group metals.

8. A method of water electrolysis, which comprises providing an auxiliary power supply, a main power supply having a power ON state and power CUTOFF state and an electrolytic cell for water electrolysis partitioned into an anode chamber including an anode and a cathode chamber including a cathode or into an anode chamber including an anode, an intermediate chamber and a cathode chamber including a cathode with a solid electrolyte, supplying water to the electrolytic cell, applying power from the main power supply to the electrolytic cell in a first direction when in a power ON state to thereby electrolyze the water to produce acidic water and alkaline water in the anode chamber and the cathode chamber, respectively, and applying power from the auxiliary power supply to the electrolytic cell so as to substantially prevent current flow in a reverse direction when liquid is present in the electrolytic cell and the main power supply is in a power CUTOFF state which comprises applying a voltage in said first direction of 1.2 V or higher across the anode and the cathode of the electrolytic cell and passing a current of 20 mA/dm$^2$ or higher through the electrolytic cell in said first direction.

9. The method of claim 8, which comprises applying power from the auxiliary power supply so as to substantially prevent current flow in a reverse direction when liquid is present in the electrolytic cell and the main power supply is in a power CUTOFF state but which power is insufficient to cause electrolysis.

10. The method of claim 8, which comprises applying power from said auxiliary power supply prior to and during the time that said main power supply assumes a power CUTOFF state.

11. The method of claim 8, wherein said auxiliary supply is in a power CUTOFF state during electrolysis, and which method comprises applying power from said auxiliary power supply simultaneous with or just prior to the time that said main power supply assumes a power CUTOFF state.

12. The method of claim 8, which comprises applying power from said auxiliary power supply when said main power supply is in a CUTOFF state and when said main power supply is also in an ON state.

13. The method of claim 8, which comprises applying a voltage in said first direction of 1.5 V or higher across the anode and the cathode of the electrolytic cell when liquid is present in the electrolytic cell and the main power supply is in a power CUTOFF state.

14. The method of claim 8, which comprises passing a current of 50 mA/dm$^2$ or higher through the electrolytic cell in said first direction when liquid is present in the electrolytic cell and the main power supply is in a power CUTOFF state.

15. The method of claim 8, which comprises (i) applying a voltage in said first direction of 1.2 V to 1.5 V across the anode and the cathode of the electrolytic cell and (ii) passing a current of 20 mA/dm$^2$ or higher through the electrolytic cell in said first direction when liquid is present in the electrolytic cell and the main power supply is in a power CUTOFF state.

16. The method of claim 8, which comprises (i) applying a voltage in said first direction of 1.2 V to 1.5 V across the anode and the cathode of the electrolytic cell and (ii) passing a current of 20 mA/dm$^2$ to 50 mA/dm$^2$ through the electrolytic cell in said first direction when liquid is present in the electrolytic cell and the main power supply is in a power CUTOFF state.

17. An apparatus for water electrolysis, which comprises an auxiliary power supply, a main power supply having a power ON state and a power CUTOFF state and an electrolytic cell for water electrolysis partitioned into an anode chamber including an anode and a cathode chamber including a cathode or into an anode chamber including an anode, an intermediate chamber and a cathode chamber including a cathode with a solid electrolyte, a water supply for supplying water to the electrolytic cell, means for applying power from the main power supply to the electrolytic cell in a first direction when in a power ON state to thereby electrolyze the water to produce acidic water and alkaline water in the anode chamber and the cathode chamber, respectively, and means for applying a voltage in said first direction of 1.2 V or higher across the anode and the cathode of the electrolytic cell and for passing a current of 20 mA/dm$^2$ or higher through the electrolytic cell in said first direction from the auxiliary power supply to the electrolytic cell to substantially prevent current flow in a reverse direction when liquid is present in the electrolytic cell and the main power supply is in a power CUTOFF state.

18. The apparatus of claim 17, which comprises means for applying a voltage in said first direction of 1.2 V to 1.5 V across the anode and the cathode of the electrolytic cell and for passing a current of 20 mA/dm$^2$ or higher through the electrolytic cell in said first direction from the auxiliary power supply to the electrolytic cell to substantially prevent current flow in a reverse direction when liquid is present in the electrolytic cell and the main power supply is in a power CUTOFF state.

19. The apparatus of claim 17, which comprises means for applying a voltage in said first direction of 1.2 V to 1.5 V across the anode and the cathode of the electrolytic cell and for passing a current of 20 mA/dm$^2$ to 50 mA/dm$^2$ through the electrolytic cell in said first direction from the auxiliary power supply to the electrolytic cell to substantially prevent current flow in a reverse direction when liquid is present in the electrolytic cell and the main power supply is in a power CUTOFF state.

20. The apparatus of claim 17, wherein said anode comprises a material selected from the group consisting of platinum group metals and oxides of platinum group metals.

* * * * *